(12) United States Patent
Koganezawa et al.

(10) Patent No.: US 8,068,150 B2
(45) Date of Patent: Nov. 29, 2011

(54) MEMORY ACCESS CONTROL APPARATUS AND IMAGE PICKUP APPARATUS

(75) Inventors: Tomohiro Koganezawa, Chiba (JP); Takeshi Shimoyama, Tokyo (JP); Kingo Koyama, Tokyo (JP); Takuji Himeno, Chiba (JP)

(73) Assignee: Sony Corporation, Tokyo (JP)

( * ) Notice: Subject to any disclaimer, the term of this patent is extended or adjusted under 35 U.S.C. 154(b) by 348 days.

(21) Appl. No.: 12/487,124

(22) Filed: Jun. 18, 2009

(65) Prior Publication Data
US 2010/0007770 A1    Jan. 14, 2010

(30) Foreign Application Priority Data
Jul. 8, 2008 (JP) ................................. 2008-177846

(51) Int. Cl.
*H04N 5/225* (2006.01)
(52) U.S. Cl. ................... 348/231.99; 711/105; 711/106; 365/233.13
(58) Field of Classification Search ............. 348/231.99, 348/231.1–231.9; 711/5, 105, 106, 107, 711/152, 154, 167, 169; 365/233.13
See application file for complete search history.

(56) References Cited

U.S. PATENT DOCUMENTS

| 7,174,467 | B1* | 2/2007 | Helms et al. | 713/300 |
| 2004/0117565 | A1* | 6/2004 | Brant et al. | 711/154 |
| 2005/0273564 | A1* | 12/2005 | Lakshmanamurthy et al. | 711/158 |
| 2007/0067596 | A1* | 3/2007 | Yu et al. | 711/170 |
| 2008/0247261 | A1* | 10/2008 | Ishikawa | 365/230.08 |

FOREIGN PATENT DOCUMENTS

| JP | 2005-94294 | 4/2005 |
| JP | 2007-310549 | 11/2007 |

* cited by examiner

*Primary Examiner* — John Villencco
*Assistant Examiner* — Kent Wang
(74) *Attorney, Agent, or Firm* — Oblon, Spivak, McClelland, Maier & Neustadt, L.L.P.

(57) ABSTRACT

A memory access control apparatus includes a memory controller controlling a memory adopting a DDR format; a DDR-PHY adjusting the timing of an interface signal between the memory controller and the memory; a DDR-PHY controller controlling the DDR-PHY; and a clock controller controlling the frequency of a clock signal. A first request signal for controlling the operation of the memory in a self-refresh mode is supplied to the memory controller, a second request signal for resetting the DDR-PHY is supplied to the DDR-PHY controller, a third request signal for changing the clock frequency is supplied to the clock controller, a fourth request signal for setting a parameter for the DDR-PHY is supplied to the DDR-PHY controller, and a fifth request signal for canceling the operation of the memory in the self-refresh mode is supplied to the memory controller in order to change the clock frequency of the memory.

5 Claims, 8 Drawing Sheets

FIG. 2

| C1 | FREQUENCY CHANGE REQUEST | | |
|---|---|---|---|
| C2 | Self Refresh Enter COMMAND REQUEST | C3 | RESPONSE |
| C4 | DDR-PHY RESET REQUEST | C5 | RESPONSE |
| C6 | CLOCK FREQUENCY CHANGE REQUEST | C7 | RESPONSE |
| C8 | DDR-PHY PARAMETER SETTING REQUEST | C9 | RESPONSE |
| C10 | Self Refresh Exit COMMAND REQUEST | C11 | RESPONSE |
| | | C12 | TERMINATION NOTIFICATION |

MEMORY ACCESS CONTROL APPARATUS AND IMAGE PICKUP APPARATUS

BACKGROUND OF THE INVENTION

1. Field of the Invention

The present invention relates to a memory access control apparatus and an image pickup apparatus. More particularly, the present invention relates to a memory access control apparatus and an image pickup apparatus that are capable of greatly reducing an effect involved in frequency change in a machine which performs high-speed data transfer and in which a memory is mounted.

2. Description of the Related Art

In recent years, Double Data Rate (DDR) methods are widely adopted, in which both rising edges and falling edges of a clock signal can be used in synchronization between the circuits in a computer to double the processing efficiency per unit time, compared with a case where the rising edges or the falling edges of the clock signal are used, for example, in order to increase the speed of data transfer between the central processing unit (CPU) and the main memory. In addition, DDR2 resulting from improvement of the performance of the DDR to achieve power saving is also proposed.

In a system having a DDR synchronous dynamic random access memory (SDRAM), a DDR2 SDRAM, or a Low Power Double Data Rate (LPDDR) SDRAM provided therein, control is generally performed so as to change the clock frequency in accordance with, for example, a necessary amount of memory or the operation mode of the system in order to suppress the power consumption. This is because the operation of the system in response to a high-speed clock can increase the power consumption per unit time.

The internal circuits are operated in synchronization with a clock signal that is externally supplied in a system having a DDR SDRAM, a DDR2 SDRAM, or a LPDDR SDRAM provided therein. However, a skew can occur due to the wiring length of signal lines, which is dependent on the circuit layout on the chip, and the skew can appear as a difference in phase between a reference clock and a data strobe signal DQS. Accordingly, it is necessary to accurately perform phase adjustment when data is read out from the DDR SDRAM operating in response to high-speed clocks. For example, a circuit called a delay locked loop (DLL) may be provided in the system for the phase adjustment. The DLL controls the delay time of an external interface, which can be caused by the wiring load or the like, to adjust the synchronization between the external interface and an internal clock. Alternatively, a delay line (DL) may be used for the phase adjustment.

An apparatus that is used in a system having a DDR SDRAM, a DDR2 SDRAM, or an LPDDR SDRAM provided therein to change the clock frequency and that is capable of selectively using either of the DLL and the DL that are provided depending on, for example, the frequency used in a memory controller is proposed (for example, refer to Japanese Unexamined Patent Application Publication No. 2007-310549).

An apparatus capable of compression of moving images in real time is also proposed (for example, refer to Japanese Unexamined Patent Application Publication No. 2005-94294). In the apparatus, the clock frequency of a controller is used as a normal frequency and a wasteful power consumption in a monitoring state is eliminated to lengthen the life of the battery before an instruction to start capturing of a moving image is issued, and a clock change controller greatly increases the clock frequency and an Moving Picture Experts Group (MPEG) converter increases the speed of access to an SDRAM storing reference data and/or search data in encoding of moving image data after the instruction to start capturing of a moving image is issued in order to enable the compression of moving images in real time.

SUMMARY OF THE INVENTION

However, it is necessary to use complicated control programs for the frequency change in the technologies disclosed in Japanese Unexamined Patent Application Publication No. 2007-310549 and Japanese Unexamined Patent Application Publication No. 2005-94294.

In addition, since instruction code and a working memory are necessary to execute the control programs for the frequency change and the memory may not be accessed in the frequency change, it is necessary to store the instruction code in a read only memory (ROM) or an SDRAM other than the memory.

Furthermore, since it takes a longer time to perform the frequency change, an effect involved in restriction of access to the memory during the frequency change can be increased.

In order to resolve the above problems, it is desirable to greatly reduce an effect involved in the frequency change in a machine which performs high-speed data transfer and in which a memory is mounted.

According to an embodiment of the present invention, a memory access control apparatus includes a memory controller controlling a memory adopting a double data rate format; a double-data-rate physical interface adjusting the timing of an interface signal transferred between the memory controller and the memory; a double-data-rate physical-interface controller controlling the double-data-rate physical interface; and a clock controller controlling the frequency of a clock signal. A first request signal for controlling the operation of the memory in a self-refresh mode is supplied to the memory controller on the basis of a blanking signal indicating the presence of access from a master device to the memory; a second request signal for resetting the double-data-rate physical interface is supplied to the double-data-rate physical-interface controller on the basis of a response signal to the first request signal, supplied from the memory controller; a third request signal for changing the clock frequency is supplied to the clock controller on the basis of a response signal to the second request signal, supplied from the double-data-rate physical-interface controller; a fourth request signal for setting a parameter for the double-data-rate physical interface in accordance with the clock frequency subjected to the change is supplied to the double-data-rate physical-interface controller on the basis of a response signal to the third request signal, supplied from the clock controller; and a fifth request signal for canceling the operation of the memory in the self-refresh mode is supplied to the memory controller on the basis of a response signal to the fourth request signal, supplied from the double-data-rate physical-interface controller, whereby changing the clock frequency of the memory.

The memory access control apparatus may be mounted in an electronic machine including a plurality of master devices. The clock frequency of the memory may be changed when a request signal for frequency change is transmitted from a central processing unit of the electronic machine, and a signal notifying the termination of the frequency change may be transmitted to the central processing unit when the frequency change is terminated.

A time period when a real-time master device that is greatly affected by an occurrence of a processing delay, among the plurality of master devices, does not access the memory may be determined on the basis of the blanking signal to change the clock frequency of the memory.

In the memory access control apparatus according to the above embodiment of the present invention, the first request signal for controlling the operation of the memory adopting the double data rate format in the self-refresh mode is supplied to the memory controller controlling the memory on the basis of the blanking signal indicating the presence of access from the master device to the memory; the second request signal for resetting the double-data-rate physical interface adjusting the timing of an interface signal transferred between the memory controller and the memory is supplied to the double-data-rate physical-interface controller controlling the double-data-rate physical interface on the basis of the response signal to the first request signal, supplied from the memory controller; the third request signal for changing the clock frequency is supplied to the clock controller controlling the frequency of a clock signal on the basis of the response signal to the second request signal, supplied from the double-data-rate physical-interface controller; the fourth request signal for setting a parameter for the double-data-rate physical interface in accordance with the clock frequency subjected to the change is supplied to the double-data-rate physical-interface controller on the basis of the response signal to the third request signal, supplied from the clock controller; and the fifth request signal for canceling the operation of the memory in the self-refresh mode is supplied to the memory controller on the basis of the response signal to the fourth request signal, supplied from the double-data-rate physical-interface controller, whereby changing the clock frequency of the memory.

According to another embodiment of the present invention, an image pickup apparatus includes a central processing unit; image pickup means for capturing an image; a master device performing processing concerning display of the captured image; a memory that stores data processed by the master device and that adopts a double data rate format; and a memory access control unit changing the frequency of the memory on the basis of an instruction from the central processing unit. The memory access control unit includes a memory controller controlling the memory; a double-data-rate physical interface adjusting the timing of an interface signal transferred between the memory controller and the memory; a double-data-rate physical-interface controller controlling the double-data-rate physical interface; and a clock controller controlling the frequency of a clock signal. In the memory access control unit, a first request signal for controlling the operation of the memory in a self-refresh mode is supplied to the memory controller on the basis of a blanking signal indicating the presence of access from the master device to the memory; a second request signal for resetting the double-data-rate physical interface is supplied to the double-data-rate physical-interface controller on the basis of a response signal to the first request signal, supplied from the memory controller; a third request signal for changing the clock frequency is supplied to the clock controller on the basis of a response signal to the second request signal, supplied from the double-data-rate physical-interface controller; a fourth request signal for setting a parameter for the double-data-rate physical interface in accordance with the clock frequency subjected to the change is supplied to the double-data-rate physical-interface controller on the basis of a response signal to the third request signal, supplied from the clock controller; and a fifth request signal for canceling the operation of the memory in the self-refresh mode is supplied to the memory controller on the basis of a response signal to the fourth request signal, supplied from the double-data-rate physical-interface controller, whereby changing the clock frequency of the memory.

In the image pickup apparatus according to the above embodiment of the present invention, an image is captured; processing concerning display of the captured image is performed; the processed data is stored in the memory adopting the double data rate format; and the frequency of the memory is changed on the basis of an instruction from the central processing unit. In the memory access control unit, the first request signal for controlling the operation of the memory in the self-refresh mode is supplied to the memory controller controlling the memory on the basis of the blanking signal indicating the presence of access from the master device to the memory; the second request signal for resetting the double-data-rate physical interface adjusting the timing of an interface signal transferred between the memory controller and the memory is supplied to the double-data-rate physical-interface controller controlling the double-data-rate physical interface on the basis of the response signal to the first request signal, supplied from the memory controller; the third request signal for changing the clock frequency is supplied to the clock controller controlling the frequency of the clock signal on the basis of the response signal to the second request signal, supplied from the double-data-rate physical-interface controller; the fourth request signal for setting a parameter for the double-data-rate physical interface in accordance with the clock frequency subjected to the change is supplied to the double-data-rate physical-interface controller on the basis of the response signal to the third request signal, supplied from the clock controller; and the fifth request signal for canceling the operation of the memory in the self-refresh mode is supplied to the memory controller on the basis of the response signal to the fourth request signal, supplied from the double-data-rate physical-interface controller, whereby changing the clock frequency of the memory.

According to the present invention, it is possible to greatly reduce an effect involved in the frequency change in a machine which performs high-speed data transfer and in which a memory is mounted.

BRIEF DESCRIPTION OF THE DRAWINGS

FIG. 2 is a table illustrating examples of signals transferred between functional blocks in FIG. 1;

DESCRIPTION OF THE PREFERRED EMBODIMENTS

Embodiments of the present invention will herein be described with reference to the attached drawings.

Figure 1:
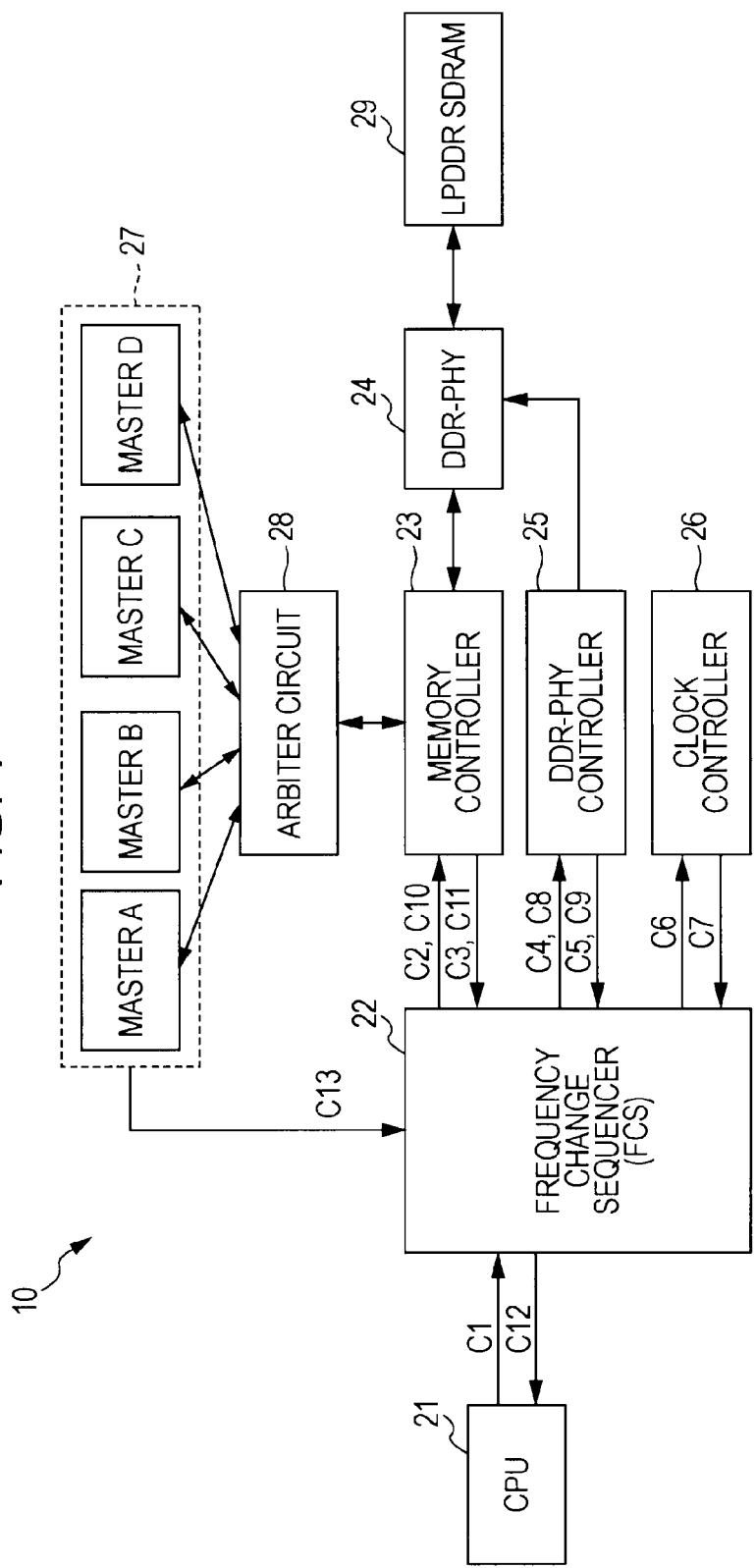
FIG. 1 is a block diagram showing an example of the configuration of a memory access control system according to an embodiment of the present invention.

FIG. 1 is a block diagram showing an example of the configuration of a memory access control system according to an embodiment of the present invention. Referring to FIG. 1, a memory access control system 10 is configured to change the clock frequency of an LPDDR SDRAM 29 in accordance with, for example, the operation mode of an electronic machine (for example, a digital camera) in which the memory access control system 10 is mounted.

DDR methods are widely adopted in recent years in electronic machines, such as digital cameras, having image capturing functions and display functions. In the DDR methods, both rising edges and falling edges of clock signals can be used for synchronization between the circuits in a computer in order to increase the speed of data transfer between the CPU and the main memory to double the processing efficiency per unit time, compared with a case where the rising edges or the falling edges of the clock signals are used. In addition, DDR2 resulting from improvement of the performance of the DDR to achieve power saving is also proposed.

Furthermore, LPDDR is also proposed, which results from reduction of the power consumption of the DDR2 in consideration of applications, such as a mobile device. The LPDDR SDRAM 29 is a memory adapted to the LPDDR.

In a electronic machine having the LPDDR SDRAM provided therein, control is generally performed so as to change the clock frequency in accordance with, for example, a necessary amount of memory or the operation mode of the electronic machine in order to suppress the power consumption. The control is performed because the operation of the electronic machine in response to high-speed clocks can increase the power consumption per unit time.

For the above reason, the memory access control system 10 shown in FIG. 1 is configured to change the clock frequency in accordance with the operation mode of an electronic machine in which the memory access control system 10 is mounted. In other words, the memory access control system 10 is configured on the assumption that the memory access control system 10 is mounted in an electronic machine, such as a digital camera.

Referring to FIG. 1, a central processing unit (CPU) 21 is included in the electronic machine in which the memory access control system 10 is mounted and is not practically provided for the memory access control system 10.

The CPU 21 performs a variety of processing in accordance with programs stored in a read only memory (ROM) (not shown) and transmits a frequency change request command to a frequency change sequencer 22. For example, the CPU 21 transmits the frequency change request command to the frequency change sequencer 22 so that the frequency is changed in accordance with the operation mode of the electronic machine in which the memory access control system 10 is mounted.

The frequency change sequencer 22 is, for example, a large-scale integrated circuit (LSI) chip. The frequency change sequencer 22 is hereinafter referred to as the FCS 22.

The FCS 22 performs a variety of signal processing concerning the change (switching) of the clock frequency. The FCS 22 supplies control signals to a memory controller 23, a DDR physical interface (DDR-PHY) controller 25, and a clock controller 26.

In addition, the FCS 22 detects the operation mode of the electronic machine in which the memory access control system 10 is mounted and detects a blanking time on the basis of an instruction supplied from the CPU 21. Specifically, the FCS 22 detects the operation mode and the blanking time on the basis of the instruction from the CPU 21 and generates the above control signals on the basis of a signal supplied from a master device block 27 to output the generated control signals.

The memory controller 23 generates, for example, an initialization command, Write command, Read command, Auto Refresh command, and Self Refresh command and supplies the generated commands to the LPDDR SDRAM 29.

A DDR-PHY 24 is a functional block that performs timing adjustment and phase adjustment of an interface signal transferred between the memory controller 23 and the LPDDR SDRAM 29. The DDR-PHY 24 has the DLL and the DL provided therein.

Both of the DL and the DLL perform the phase adjustment of a periodic signal. The DL is a combination of delay buffers each having a shorter delay time and selectors while the DLL adjusts a certain phase of an internal clock signal used in an internal circuit with respect to a reference clock signal that is externally supplied. The use of the DLL enables the precise phase adjustment but increases the power consumption, compared with the DL.

Accordingly, for example, when the clock frequency is changed to a lower frequency, the use of the DL, instead of the DLL, can reduce the power consumption.

Upon reception of writing data along with the Write command from the memory controller 23, the DDR-PHY 24 performs parallel-to-serial conversion to the writing data and transfers the data resulting from the parallel-to-serial conversion to the LPDDR SDRAM 29 at a double data rate. Upon reception of the Read command from the memory controller 23, the DDR-PHY 24 adjusts the phase of a data strobe signal (DQS), performs serial-to-parallel conversion to data read out from the LPDDR SDRAM 29, and transfers the data resulting from the serial-to-parallel conversion to the memory controller 23 at a single data rate.

The DDR-PHY controller 25 is a functional block that controls the DDR-PHY 24. Specifically, the DDR-PHY controller 25 initializes the DDR-PHY 24 and selects the DDL or the DL. The DDR-PHY controller 25 sets the phase if the DLL is selected and sets the delay if the DL is selected.

The clock controller 26 is a functional block that controls, for example, a clock generator (not shown) to control the clock frequency of the memory access control system 10 or the clock frequency of the entire electronic machine in which the memory access control system 10 is mounted.

The master device block 27 is a functional block including multiple master devices. In the example shown in FIG. 1, the master device block 27 includes a master device A (denoted by MASTER A in FIG. 1), a master device B (denoted by MASTER B in FIG. 1), a master device C (denoted by MASTER C in FIG. 1), and a master device D (denoted by MASTER D in FIG. 1).

An arbiter circuit 28 is a functional block that performs prioritization, bandwidth control, etc. on the basis of a memory access request from any master device in the master device block 27 to transmit and receive a signal to and from the memory controller 23. Specifically, each of the master devices from the master device A to the master device D transmits an access request to the memory controller 23 via the arbiter circuit 28 to write data in the LPDDR SDRAM 29 or read data from the LPDDR SDRAM 29.

As described above, the LPDDR SDRAM 29 transmits and receives a signal to and from the memory controller 23 via the DDR-PHY 24 and the DDR-PHY 24 has the DLL and the DL provided therein. Accordingly, it is necessary to perform the following processes in the memory access control system 10 in the change of the clock frequency.

In a first process in the change of the clock frequency, the LPDDR SDRAM 29 is caused to operate in a self-refresh mode.

The memory controller 23 supplies a Refresh command to the LPDDR SDRAM 29 when the memory access control system 10 is activated. The supply of the Refresh command is performed because it is generally necessary to perform a refresh operation on a certain refresh period in order to hold data that is stored in a memory cell of, for example, an SDRAM as electric charge. The memory controller 23 normally has an automatic refresh function for supplying the Refresh command at certain intervals that are set in advance.

However, during the change of the clock frequency, the memory controller 23 is not capable of supplying a command to the DDR-PHY 24 for a certain time period. Accordingly, the LPDDR SDRAM 29 is caused to operate in the self-refresh mode. In the self-refresh mode, the LPDDR SDRAM 29 operates while periodically refreshing the LPDDR SDRAM 29 even if the Refresh command is not supplied from the memory controller 23. The operation of the LPDDR SDRAM 29 in the self-refresh mode prior to the change of the clock frequency allows the data stored in the memory cell of the LPDDR SDRAM 29 as electric charge to be appropriately held during the change of the clock frequency.

In a second process in the change of the clock frequency, the DDR-PHY 24 is reset. This is because it is necessary to reset the DDR-PHY 24 along with the change of the clock frequency to reset various parameters. As the result of the second process, for example, the DLL or the DL provided in the DDR-PHY 24 is selected in accordance with the changed clock frequency and, for example, the parameters that are to be set in the DLL or the DL are determined in accordance with the result of the selection.

In a third process in the change of the clock frequency, the clock controller 26 is caused to change the clock frequency.

In a fourth process in the change of the clock frequency, the operation of the LPDDR SDRAM 29 in the self-refresh mode is cancelled.

Referring to FIG. 1, reference numerals c1 to C13 assigned to arrows connecting the FCS 22 to the CPU 21, the memory controller 23, the DDR-PHY controller 25, the clock controller 26, and master device block 27 correspond to signals shown in a table in FIG. 2.

Reference numeral c1 denotes a signal to request frequency change (a frequency change request signal) and is transmitted from the CPU 21 to the FCS 22.

Reference numeral c2 denotes a signal to request a Self Refresh Enter command (a Self Refresh Enter command request signal) and is supplied from the FCS 22 to the memory controller 23. The memory controller 23 causes the LPDDR SDRAM 29 to operate in the self-refresh mode in response to the c2 signal.

Reference numeral c3 denotes a response signal to the Self Refresh Enter command request signal and is supplied from the memory controller 23 to the FCS 22.

The c2 and c3 signals correspond to the first process in the change of the clock frequency.

Reference numeral c4 denotes a signal to request resetting of the DDR-PHY 24 (a DDR-PHY reset request signal) and is supplied from the FCS 22 to the DDR-PHY controller 25. The DDR-PHY 24 is reset in response to the c4 signal.

Reference numeral c5 denotes a response signal to the DDR-PHY reset request signal and is supplied from the DDR-PHY controller 25 to the FCS 22.

The c4 and c5 signals correspond to the second process in the change of the clock frequency.

Reference numeral c6 denotes a signal to request changing of the clock frequency (a clock frequency change request signal) and is supplied from the FCS 22 to the clock controller 26. The clock frequency is changed in response to the c6 signal.

Reference numeral c7 denotes a response signal to the clock frequency change request signal and is supplied from the clock controller 26 to the FCS 22.

The c6 and c7 signals correspond to the third process in the change of the clock frequency.

Reference numeral c8 denotes a signal to request setting of the parameters of the DDR-PHY (a DDR-PHY parameter setting request signal) and is supplied from the FCS 22 to the DDR-PHY controller 25. In response to the c8 signal, for example, the DLL or the DL provided in the DDR-PHY 24 is selected in accordance with the changed clock frequency and, for example, the parameters that are to be set in the DLL or the DL are determined in accordance with the result of the selection.

Reference numeral c9 denotes a response signal to the DDR-PHY parameter setting request signal and is supplied from the DDR-PHY controller 25 to the FCS 22.

The c8 and c9 signals correspond to the second process in the change of the clock frequency.

Reference numeral c10 denotes a signal to request a Self Refresh Exit command (a Self Refresh Exit command request signal) and is supplied from the FCS 22 to the memory controller 23. The memory controller 23 cancels the operation of the LPDDR SDRAM 29 in the self-refresh mode in response to the c10 signal.

Reference numeral c11 denotes a response signal to the Self Refresh Exit command request signal and is supplied from the memory controller 23 to the FCS 22.

The c10 and c11 signals correspond to the fourth process in the change of the clock frequency.

Reference numeral c12 denotes a termination notification signal indicating that the change of the clock frequency is terminated and is supplied from the FCS 22 to the CPU 21.

Although not shown in FIG. 2, reference numeral c13 denotes a blanking signal supplied from the master device block 27. The blanking signal will be described below.

The clock frequency of the memory access control system 10 is changed in the above manner.

According to the embodiment of the present invention, the c2 to c11 signals in FIG. 2 are generated by the corresponding block in the FCS 22, the CPU 21, the memory controller 23, the DDR-PHY controller 25, the clock controller 26, and the master device block 27 with logic circuits, which are hardware. Accordingly, the signals shown in FIG. 2 excepting the c1 and c12 signals are generated without processing by software.

In a process of changing the clock frequency in related art, the c2, c4, c6, c8, and c10 signals in FIG. 2 are generated by software. However, if the c2, c4, c6, c8, and c10 signals in FIG. 2 are generated by software, the control programs for the frequency change become complicated. In addition, since instruction code and a working memory are necessary to execute the control programs for the frequency change and the memory may not be accessed during the frequency change, it is necessary to store the instruction code in a ROM or an SDRAM other than the memory. Furthermore, since it takes a longer time to perform the frequency change, an effect involved in restriction of access to the LPDDR SDRAM 29 during the frequency change can be increased.

In contrast, according to the embodiment of the present invention, since the c2, c4, c6, c8, and c10 signals in FIG. 2 are generated without processing by software, it is not necessary to create the complicated control programs and to provide the additional working memory. In addition, since the frequency change is performed by hardware not via software in the embodiment of the present invention, it is possible to shorten the processing time. As a result, for example, the time period during which access to the memory is restricted due to the frequency change is shortened and an effect on the function of the electronic machine due to the frequency change is reduced. Furthermore, since the frequency change is performed by hardware not via software, the processing load on the CPU 21 during the frequency change is greatly lightened, thus reducing an effect involved in the frequency change.

Figure 3:
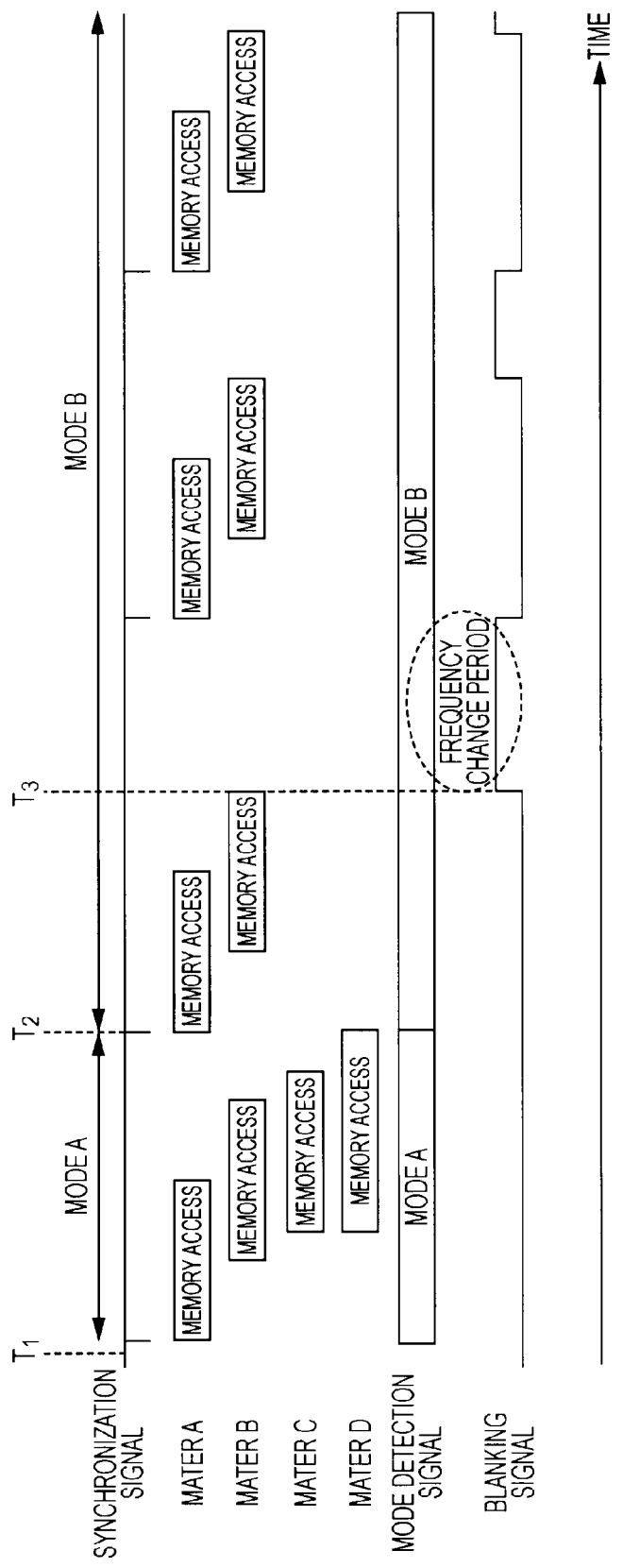
FIG. 3 is a timing chart illustrating an example of how to change a clock frequency in the memory access control system in FIG. 1.

FIG. 3 a timing chart illustrating an example of how to change the clock frequency in the memory access control system 10. Referring to FIG. 3, the horizontal axis represents time and the access time from each of the master devices from the master device A to the master device D (denoted by MASTER A to MASTER D in FIG. 3) to LPDDR SDRAM 29 is indicated by a rectangular frame in which "MEMORY ACCESS" is described. In the example in FIG. 3, all the master devices from the master device A to the master device D are real-time master devices, such as display master device.

Arrows at the top of FIG. 3 indicate the modes of the electronic machine in which the memory access control system 10 is mounted. Specifically, the electronic machine in which the memory access control system 10 is mounted operates in a mode A from a time T1 to a time T2 and operates in a mode B after the time T2.

A synchronization signal in FIG. 3 identifies synchronization times of the memory access control system 10 on the basis of pulses protruding downward.

A mode detection signal in FIG. 3 represents the mode A or the mode B and is supplied from the FCS 22.

A blanking signal in FIG. 3 is supplied from the master device block 27 and corresponds to the c13 signal in FIG. 1. The real-time master device is greatly affected by an occurrence of, for example, a processing delay. For example, the display master device is not capable of normally displaying an image if access to the memory is suspended.

The blanking signal is used to identify the time when the display master device, which is a real-time master device, does not access the LPDDR SDRAM 29. In the example in FIG. 3, the level of the blanking signal is switched to high ("H") when none of the master device A to the display master device D accesses the LPDDR SDRAM 29 and the level thereof is switched to low ("L") when any of the master device A to the master device D accesses the LPDDR SDRAM 29. The level of the blanking signal is switched to "H" when the access to the memory from the master devices from the master device A to the master device D, which are real-time master devices, is terminated (when the second access to the memory from the master device B is terminated in the example in FIG. 3).

In the example in FIG. 3, the clock frequency is high in the mode A of the electronic machine in which at least one of the master devices from the master device A to the master device D accesses the LPDDR SDRAM 29. In contrast, in the mode B, either of the master device A and the master device B access the LPDDR SDRAM 29, and the CPU 21 changes the clock frequency to a lower frequency in order to decrease the power consumption when the electronic machine operates in the mode B.

Before the time T1, the CPU 21 transmits the c1 signal described above with reference to FIG. 2 to the FCS 22. Specifically, the CPU 21 instructs the FCS 22 to decrease the clock frequency in the operation in the mode B. The FCS 22 monitors the mode detection signal in response to the instruction to detect the current operation mode. Although the mode detection signal is not shown in FIGS. 1 and 2, the mode detection signal is supplied to the FCS 22, for example, in addition to the c1 signal from the CPU 21.

At the time T2, the FCS 22 detects that the operation mode of the electronic machine is switched to the mode B. The FCS 22 is in a waiting state until the level of the blanking signal is switched "H" and, at a time T3, the FCS 22 detects that the level of the blanking signal is switched to "H".

After the time T3, the FCS 22 sequentially outputs the c2, c4, c6, c8, c10, and c12 signals described above with reference to FIG. 2. As a result, the series of processes described above with reference to FIG. 2 are performed. Referring to FIG. 3, the time period since the c2 signal in FIG. 2 is output until the c12 (or c11) signal is output is denoted as a "frequency change period".

As described above, the frequency change processes are performed during the time when the access to the memory from the real-time master devices does not occur. This can prevent, for example, an image distortion from occurring during the frequency change processes.

Figure 4:
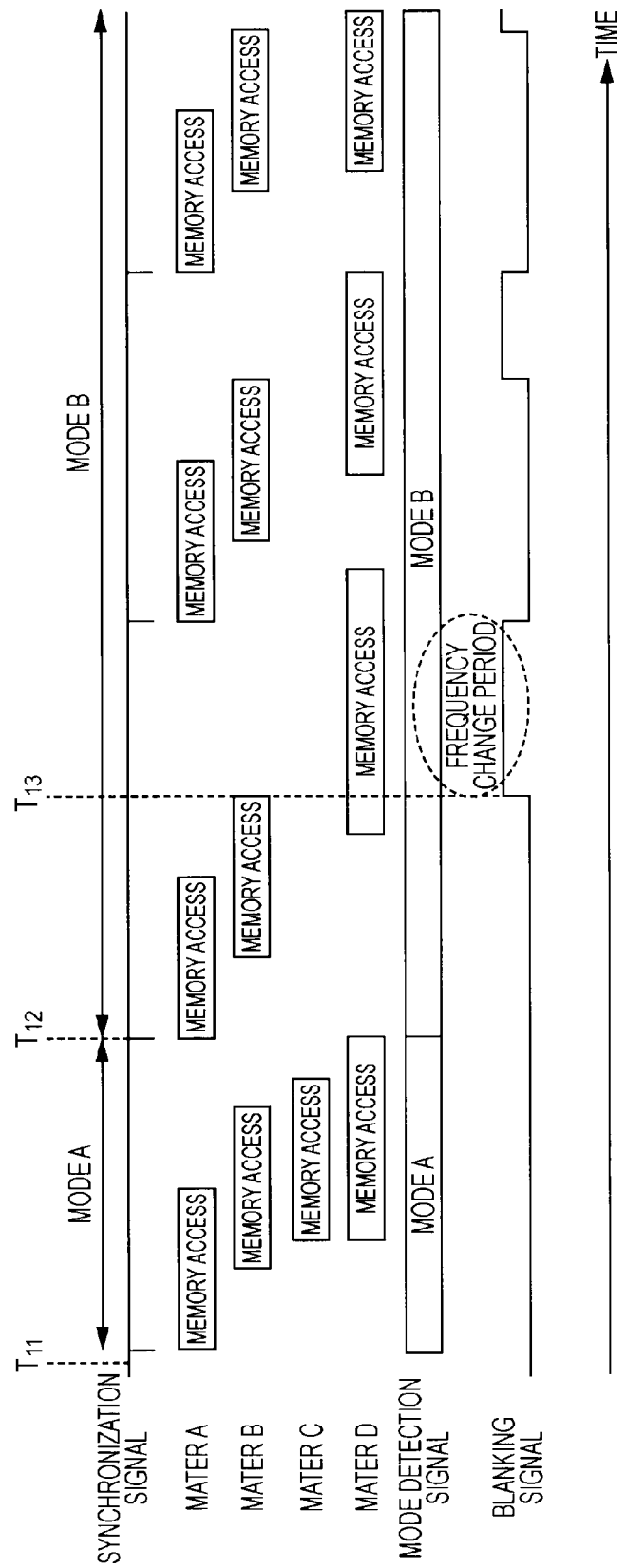
FIG. 4 is a timing chart illustrating another example of how to change the clock frequency in the memory access control system in FIG. 1.

FIG. 4 is a timing chart illustrating another example of how to change the clock frequency in the memory access control system 10, as in FIG. 3. Also in FIG. 4, the horizontal axis represents time and the access time from each of the master devices from the master device A to the master device D (denoted by MASTER A to MASTER D in FIG. 4) to LPDDR SDRAM 29 is indicated by a rectangular frame in which "MEMORY ACCESS" is described. In the example in FIG. 4, the master devices from the master device A to the master device C are real-time master devices, such as display master devices, while the master device D is a best-effort master device, which is different from the real-time master device.

The best-effort master device is not greatly affected by, for example, suspension of access to the memory. Accordingly, in the example in FIG. 4, the operation of the electronic machine is not severely affected even if the access to the memory from the master device D is suspended.

Also in the example in FIG. 4, arrows at the top of FIG. 4 indicate the modes of the electronic machine in which the memory access control system 10 is mounted. Specifically, the electronic machine in which the memory access control system 10 is mounted operates in the mode A from a time T11 to a time T12 and operates in the mode B after the time T12.

Since the synchronization signal and the mode detection signal in FIG. 4 are the same as those in FIG. 3, a detailed description is omitted herein.

In the example in FIG. 4, the level of the blanking signal is switched to "H" at a time T13. Although the access to the memory from the master device D occurs at the time T13, the master device D is a best-effort master device, as described above. Accordingly, the level of the blanking signal is switched to "H" when the access to the memory from the master devices from the master device A to the master device C, which are real-time master devices, is terminated (when the second access to the memory from the master device B is terminated in the example in FIG. 4).

Also in the example in FIG. 4, before the time T11, the CPU 21 transmits the c1 signal described above with reference to FIG. 2 to the FCS 22. Specifically, the CPU 21 instructs the FCS 22 to decrease the clock frequency in the operation in the mode B. The FCS 22 monitors the mode detection signal in response to the instruction to detect the current operation mode.

At the time T12, the FCS 22 detects that the operation mode of the electronic machine is switched to the mode B. The FCS 22 is in a waiting state until the level of the blanking signal is switched to "H" and, at the time T13, the FCS 22 detects that the level of the blanking signal is switched to "H".

After the time T13, the FCS 22 sequentially outputs the c2, c4, c6, c8, c10, and c12 signals described above with reference to FIG. 2. As a result, the series of processes described above with reference to FIG. 2 are performed. The time period since the c2 signal in FIG. 2 is output until the c12 (or c11) signal is output is denoted as the "frequency change period" also in FIG. 4.

As described above, the frequency change processes are performed during the time period when the access to the memory from the real-time master devices does not occur. Accordingly, although the access to the memory from the best-effort master device may be suspended as in the example in FIG. 4, the access to the memory from the real-time master device is not suspended. Consequently, according to the embodiment of the present invention, it is possible to prevent, for example, an image distortion from occurring during the frequency change processes.

Figure 5:
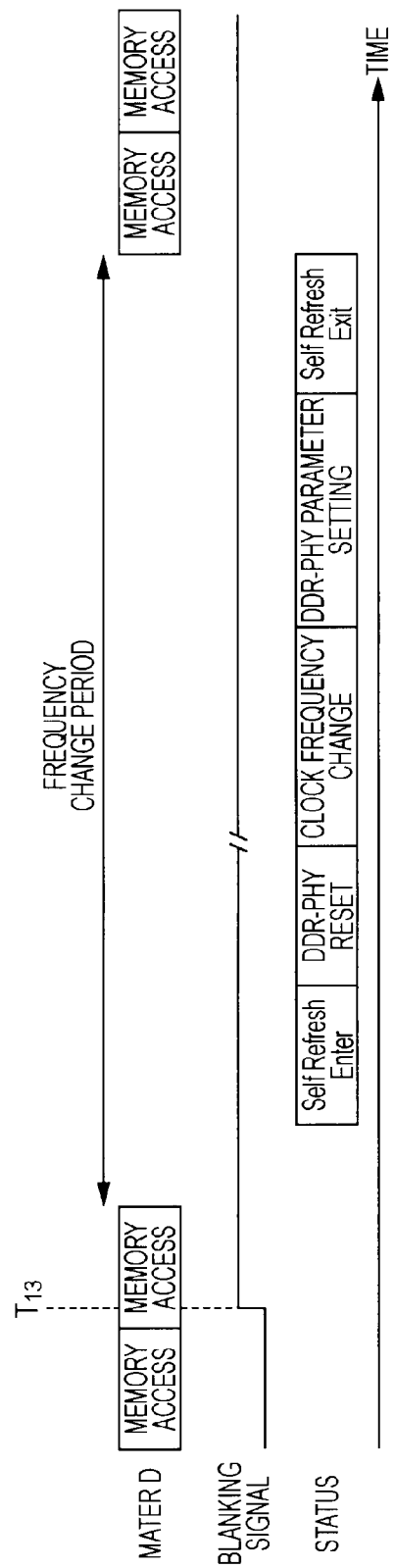
FIG. 5 is a timing chart illustrating a frequency change period in FIG. 4 in detail.

FIG. 5 is a timing chart illustrating the "frequency change period" in detail. Referring to FIG. 5, the horizontal axis represents time and each access time from master device D in FIG. 4 to LPDDR SDRAM 29 is indicated by a rectangular frame in which "MEMORY ACCESS" is described.

Frames corresponding to the following time periods are indicated as statuses in the example in FIG. 5.

A time period since the c2 signal in FIG. 2 is transmitted until the c4 signal is transmitted is indicated by a rectangular frame in which "Self Refresh Enter" is described. A time period since the c4 signal in FIG. 2 is transmitted until the c6 signal is transmitted is indicated by a rectangular frame in which "DDR-PHY RESET" is described. A time period since the c6 signal in FIG. 2 is transmitted until the c8 signal is transmitted is indicated by a rectangular frame in which "CLOCK FREQUENCY CHANGE" is described. A time period since the c8 signal in FIG. 2 is transmitted until the c10 signal is transmitted is indicated by a rectangular frame in which "DDR-PHY PARAMETER SETTING" is described. A time period since the c10 signal in FIG. 2 is transmitted until the c12 signal is transmitted is indicated by a rectangular frame in which "Self Refresh Exit" is described.

As shown in FIG. 5, after a certain delay time elapsed since the time T13 when the level of the blanking signal is switched to "H", the c2 signal in FIG. 2 is transmitted. The access to the memory from the master device D is suspended at the time when the c2 signal is transmitted.

Also as shown in FIG. 5, the access to the memory from the master device D is restarted after the c11 signal in FIG. 2 (the response signal to the c10 signal) is transmitted.

Figure 6:
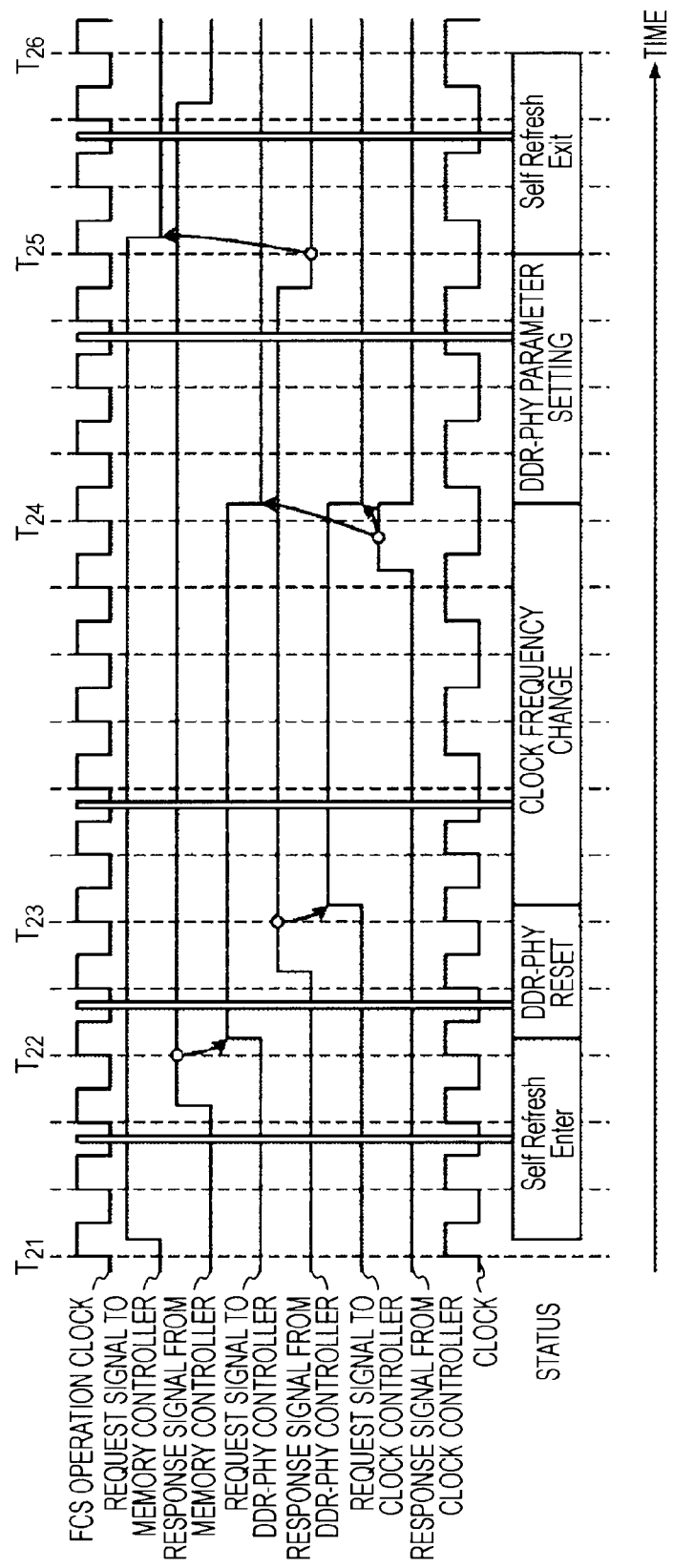
FIG. 6 is a timing chart illustrating examples of various response signals and response signals in order to describe statuses in FIG. 5 in detail.

FIG. 6 is a timing chart illustrating various response signals and response signals transferred between the FCS 22 and the memory controller 23, the DDR-PHY controller 25, and the clock controller 26 in order to describe the statuses in FIG. 5 in detail.

At the top of FIG. 6, the operation clocks of the FCS 22 are shown as pulses.

Referring to FIG. 6, after a certain delay time elapsed since the first operation clock of the FCS 22 is applied at a time T21, the FCS 22 transmits a request signal to the memory controller 23. The request signal that is transmitted at this time corresponds to the c2 signal in FIG. 2. The "H" level of the request signal represents the transmission of the request signal in the example in FIG. 6.

Upon transmission of the request signal from the FCS 22, the memory controller 23 automatically causes the LPDDR SDRAM 29 to operate in the self-refresh mode.

After a certain delay time elapsed since the request signal is transmitted to the memory controller 23, the memory controller 23 transmits a response signal to the FCS 22. The response signal that is transmitted at this time corresponds to the c3 signal in FIG. 2. The "H" level of the response signal represents the transmission of the response signal in the example in FIG. 6.

After a time T22 when a pulse of the operation clock of the FCS 22 rises after the response signal is transmitted from the memory controller 23 to the FCS 22, a request signal is transmitted to the DDR-PHY controller 25. The request signal that is transmitted at this time corresponds to the c4 signal in FIG. 2. The "H" level of the request signal represents the transmission of the request signal in the example in FIG. 6.

After a certain delay time elapsed since the request signal is transmitted to the DDR-PHY controller 25, the DDR-PHY controller 25 transmits a response signal to the FCS 22. The response signal that is transmitted at this time corresponds to the c5 signal in FIG. 2. The "H" level of the response signal represents the transmission of the response signal in the example in FIG. 6.

After a time T23 when a pulse of the operation clock of the FCS 22 rises after the response signal is transmitted from the DDR-PHY controller 25 to the FCS 22, a request signal is transmitted to the clock controller 26. The request signal that is transmitted at this time corresponds to the c6 signal in FIG. 2. The "H" level of the request signal represents the transmission of the request signal in the example in FIG. 6.

Then, the pulse width of the clock of the electronic machine, shown as the second signal from the bottom in FIG. 6, is expanded. In other words, the clock frequency of the electronic machine is changed from a higher frequency to a lower frequency.

After a certain delay time elapsed since the request signal is transmitted to the clock controller 26, the clock controller 26 transmits a response signal to the FCS 22. The response signal that is transmitted at this time corresponds to the c7 signal in FIG. 2. The "H" level of the response signal represents the transmission of the response signal in the example in FIG. 6.

After a time T24 when a pulse of the operation clock of the FCS 22 rises after the response signal is transmitted from the clock controller 26 to the FCS 22, the FCS 22 stops the transmission of the request signal to the DDR-PHY controller 25 and stops the transmission of the request signal to the clock controller 26. The "L" level of the request signals represents the stop of the transmission of the request signals in the example in FIG. 6.

When the transmission of the request signal to the DDR-PHY controller 25 is stopped, the setting of the parameters for the DDR-PHY 24 is performed. The stop of the transmission of the request signal from the FCS 22 to the DDR-PHY controller 25 corresponds to the supply of the c8 signal in FIG. 2.

After a certain delay time elapsed since the transmission of the request signal to the DDR-PHY controller 25 is stopped, the DDR-PHY controller 25 stops the transmission of the response signal to the FCS 22. The "L" level of the response signal represents the stop of the transmission of the response signal in the example in FIG. 6. The stop of the transmission of the response signal from the DDR-PHY controller 25 to the FCS 22 corresponds to the c9 signal in FIG. 2.

After a time T25 when a pulse of the operation clock of the FCS 22 rises after the transmission of the response signal from the DDR-PHY controller 25 is stopped, the FCS 22 stops the transmission of the request signal to the memory controller 23. The "L" level of the request signal represents the stop of the transmission of the request signal in the example in FIG. 6.

The stop of the transmission of the request signal from the FCS 22 to the memory controller 23 corresponds to the supply of the c10 signal in FIG. 2. Specifically, the memory controller 23 automatically causes the LPDDR SDRAM 29 to cancel the operation in the self-refresh mode when the transmission of the request signal from the FCS 22 is stopped.

After a certain delay time elapsed since the transmission of the request signal to the memory controller 23 is stopped, the memory controller 23 stops the transmission of the response signal to the FCS 22. The "L" level of the response signal represents the stop of the transmission of the response signal in the example in FIG. 6.

The stop of the transmission of the response signal from the memory controller 23 to the FCS 22 corresponds to the supply of the c11 signal in FIG. 2. After a time T26 when a pulse of the operation clock of the FCS 22 rises after the transmission of the response signal from the memory controller 23 is stopped, the FCS 22 recognizes the cancellation of the operation of the LPDDR SDRAM 29 in the self-refresh mode.

The series of signals described above with reference to FIG. 2 are generated and transmitted in the above manner.

Figure 7:
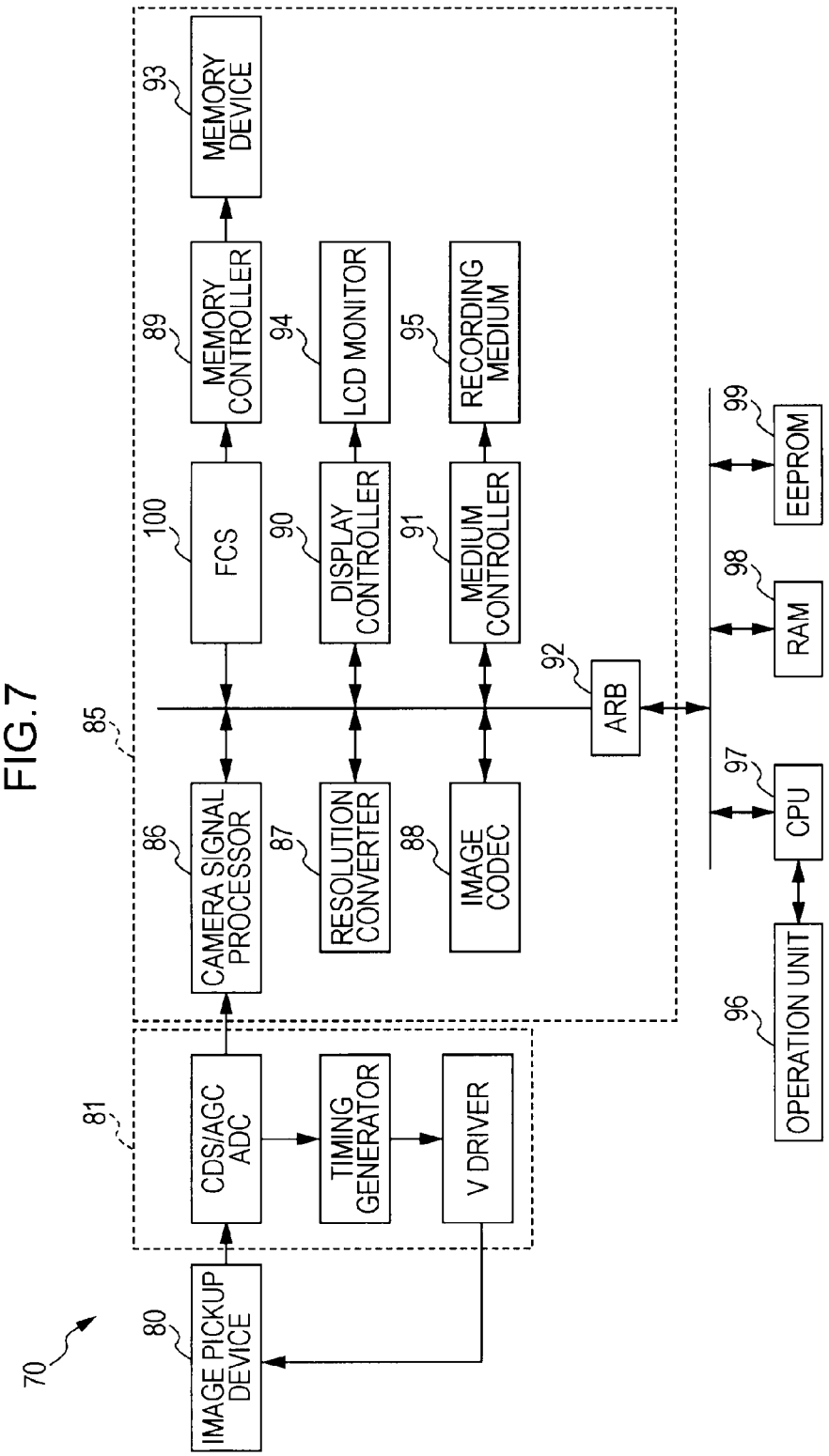
FIG. 7 is a block diagram showing an example of the configuration of an image pickup apparatus according to an embodiment of the present invention.

FIG. 7 is a block diagram showing an example of the configuration of an image pickup apparatus 70 according to an embodiment of the present invention. The image pickup apparatus 70 is, for example, a digital camera.

Referring to FIG. 7, an image pickup device 80 is a photoelectric conversion sensor, such as a charge coupled device (CCD) or a complementary metal oxide semiconductor (CMOS).

A pre-processing unit 81 performs correlated double sampling (CDS) for image information on an electrical signal supplied from the image pickup device 80 to keep a desired signal to noise (S/N) ratio, performs automatic gain control (AGC) to control the gain, and performs analog-to-digital conversion (ADC) to generate image data, which is a digital signal. A timing generator and a V driver in the pre-processing unit 81 control the driving timing of the image pickup device 80.

The data output from the pre-processing unit 81 is supplied to a camera digital-signal processor (DSP) unit 85. The camera DSP unit 85 includes a camera signal processor 86, a resolution converter 87, an image coder-decoder (CODEC) 88, a memory controller 89, a display controller 90, a medium controller 91, an arbiter (ARB) 92, a memory device 93, a liquid crystal display (LCD) monitor 94, a recording medium 95, and an FCS 100.

The camera signal processor 86 performs certain processing for the data supplied from the pre-processing unit 81 and outputs the data subjected to the certain processing as image data.

The resolution converter 87 converts the resolution of the image data output from the camera signal processor 86, if necessary.

The image CODEC 88 compresses and encodes the image data output from the camera signal processor 86 by a compression-encoding method that is set in advance.

The memory controller 89 controls the memory device 93, and the display controller 90 controls the LCD monitor 94.

The memory device 93 is, for example, an LPDDR SDRAM.

The memory controller 89 includes functional blocks corresponding to the memory controller 23, the DDR-PHY 24, the DDR-PHY controller 25, the clock controller 26, and the arbiter circuit 28 in FIG. 1.

The FCS 100 is provided between the memory controller 89 and the ARB 92. The FCS 100 is a functional block similar to the FCS 22 in FIG. 1.

The medium controller 91 controls the recording medium 95. The recording medium 95 is, for example, a memory card using a semiconductor memory, a digital versatile disk-recordable (DVD-R), or a magnetic disk.

The ARB 92 functions as an interface between a CPU 97 and the camera DSP unit 85. The CPU 97 loads a program from an electrically erasable programmable read only memory (EEPROM) 99 on the basis of a signal supplied from an operation unit 96, executes the program by using a random access memory (RAM) 98, which is a working memory, and performs a variety of processing while communicating with the camera DSP unit 85.

The image pickup apparatus 70 in FIG. 7 operates in a high-speed image capturing mode in which image capturing is performed at a high speed and in a monitoring mode in which a captured image from a lens (not shown) is displayed in the LCD monitor 94. The image pickup apparatus 70 operates in response to a high-frequency clock in the high-speed image capturing mode and operates in response to a low-frequency clock in the monitoring mode.

Figure 8:
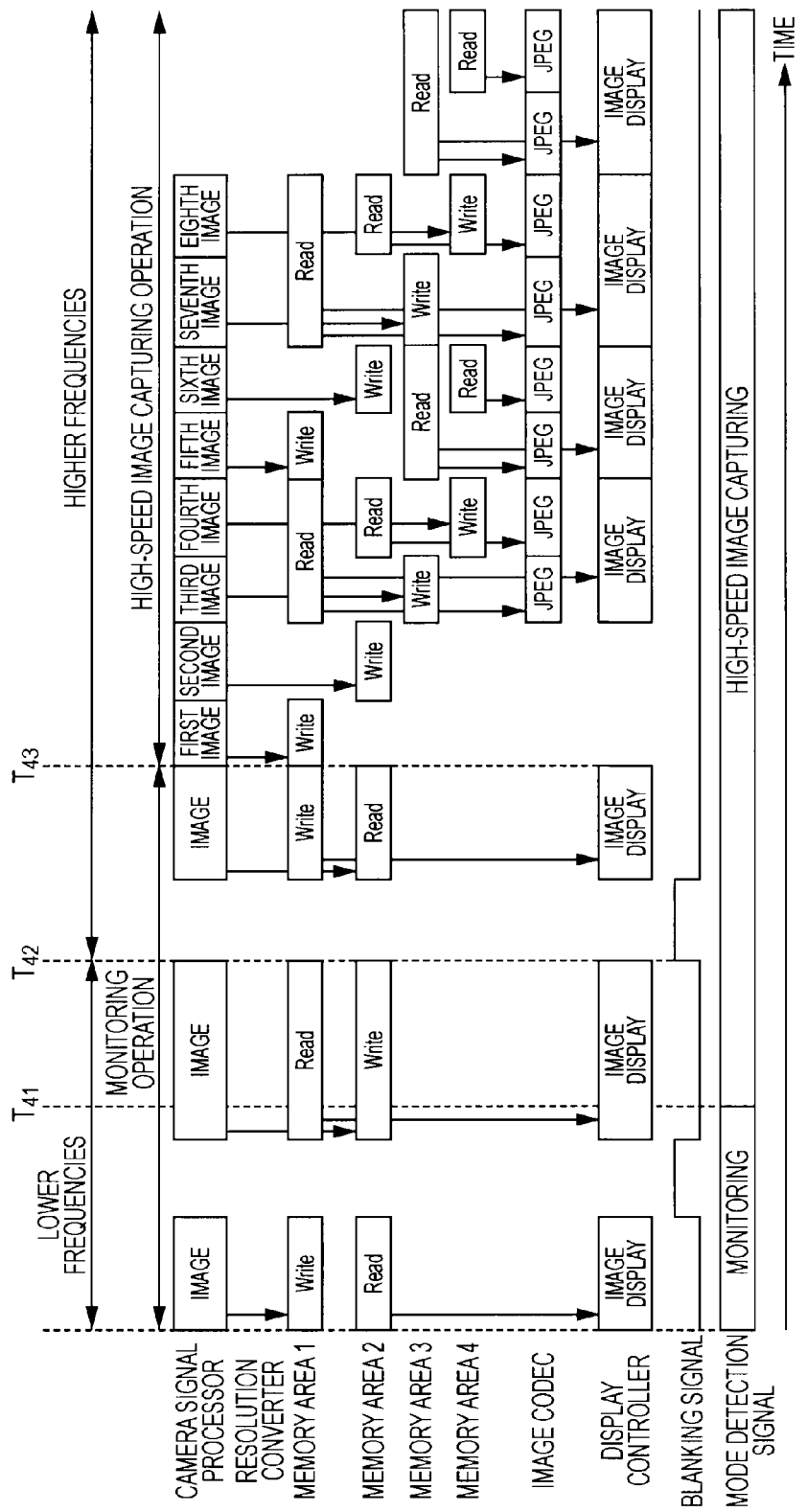
FIG. 8 is a timing chart illustrating an example of how to change the clock frequency in the image pickup apparatus in FIG. 7.

FIG. 8 is a timing chart illustrating an example in which the operation mode of the image pickup apparatus 70 is switched from the monitoring mode to the high-speed image capturing mode and the clock frequency of the image pickup apparatus 70 is switched from a lower frequency to a higher frequency.

The monitoring is performed, for example, in the following manner in the image pickup apparatus 70.

When the camera DSP unit 85 receives data from the pre-processing unit 81, the data is supplied to the resolution converter 87 through the camera signal processor 86 and the size of the image corresponding to the supplied data is changed in the resolution converter 87. The image data subjected to the size change is written in the memory device 93 through the memory controller 89. In the monitoring, the resolution converter 87 sets two memory areas (a memory area 1 and a memory area 2) in the memory space, which a virtual space in the memory device 93 for the monitoring. The resolution converter 87 writes first image data in the memory area 1 and writes second image data in the memory area 2 to flip the image data for use. Similarly, the display controller 90 flips the image data in the memory area 1 and the memory area 2 for reading and supplies the readout image data to the LCD monitor 94.

The high-speed image capturing is performed, for example, in the following manner in the image pickup apparatus 70.

When the camera DSP unit 85 receives data from the pre-processing unit 81 on the basis of an instruction of a user input with the operation unit 96, the data is supplied to the resolution converter 87 through the camera signal processor 86 and the size of the image corresponding to the supplied data is changed in the resolution converter 87. The image data subjected to the size change is written in the memory device 93 through the memory controller 89. In the high-speed image capturing, the resolution converter 87 sets four memory areas (a memory area 1, a memory area 2, a memory area 3, and a memory area 4) in the memory space, which a virtual space in the memory device 93. The resolution converter 87 writes first captured image data in the memory area 1, second captured image data in the memory area 2, third captured image data in the memory area 3, fourth captured image data in the memory area 4, fifth captured image data in the memory 1, and so on.

The display controller 90 alternately reads out the data in the memory area 1 and the data in the memory area 3, which are processed and written by the resolution converter 87, and supplies the readout data to the LCD monitor 94. The image CODEC 88 sequentially reads out the data from the memory area 1, the memory area 2, the memory area 3, and the memory area 4, which are processed and written by the resolution converter 87, compresses and encodes the readout data into stream data according to, for example, Joint Photographic Experts Group (JPEG) or MPEG, and writes the data resulting from the compression and encoding in the recording medium 95 through the medium controller 91.

Here, the camera signal processor 86, the resolution converter 87, and the display controller 90 are real-time master devices. The resolution converter 87 operates as a real-time master device in the monitoring mode while the resolution converter 87 operates as a best-effort master device in the high-speed image capturing mode.

The timing chart in FIG. 8 illustrates how to change the clock frequency in the image pickup apparatus 70. Referring to FIG. 8, the horizontal axis represents time and each time period during which image data is supplied from the camera signal processor 86 is indicated by a rectangular frame in which "IMAGE" is described.

The access time from the resolution converter 87 to each of the memory area 1, the memory area 2, the memory area 3, and the memory area 4 is indicated by a rectangular frame in which "Read" or "Write" is described.

The display time period during which the display controller 90 displays each image in the LCD monitor 94 is indicated by a rectangular frame in which "IMAGE DISPLAY" is described.

Each time period during which the image CODEC 88 compresses and encode data is indicated by a rectangular frame in which "JPEG" is written.

Since the mode detection signal and the blanking signal in FIG. 8 are the same as those described above with reference to in FIG. 3 or 4, a detailed description is omitted herein.

Referring to FIG. 8, at a time T41, the mode detection signal is switched from the monitoring mode to the high-speed image capturing mode.

At a time T42 when the level of the blanking signal is switched to "H", the change of the clock frequency is performed. At this time, the signals described above with reference to FIG. 2 are transferred between the FCS 100 and the memory controller 89 to change the clock frequency from a lower frequency to a higher frequency.

At a time T43, the image pickup apparatus 70 operates in the high-speed image capturing mode (the high-speed image capturing operation). Before the time T43, the image pickup apparatus 70 continues to operate in the monitoring mode (the monitoring operation).

The series of processes described above may be performed in time series in the described order or may be performed in parallel or individually.

The present application contains subject matter related to that disclosed in Japanese Priority Patent Application JP 2008-177846 filed in the Japan Patent Office on Jul. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A memory access control apparatus comprising:

a memory controller controlling a memory adopting a double data rate format;

a double-data-rate physical interface adjusting the timing of an interface signal transferred between the memory controller and the memory;

a double-data-rate physical-interface controller controlling the double-data-rate physical interface; and a clock controller controlling the frequency of a clock signal, wherein a first request signal for controlling the operation of the memory in a self-refresh mode is supplied to the memory controller on the basis of a blanking signal indicating the presence of access from a master device to the memory; a second request signal for resetting the double-data-rate physical interface is supplied to the double-data-rate physical-interface controller on the basis of a response signal to the first request signal, supplied from the memory controller; a third request signal for changing the clock frequency is supplied to the clock controller on the basis of a response signal to the second request signal, supplied from the double-data-rate physical-interface controller; a fourth request signal for setting a parameter for the double-data-rate physical interface in accordance with the clock frequency subjected to the change is supplied to the double-data-rate physical-interface controller on the basis of a response signal to the third request signal, supplied from the clock controller; and a fifth request signal for canceling the operation of the memory in the self-refresh mode is supplied to the memory controller on the basis of a response signal to the fourth request signal, supplied from the double-data-rate physical-interface controller, whereby changing the clock frequency of the memory.

2. The memory access control apparatus according to claim 1, wherein the memory access control apparatus is mounted in an electronic machine including a plurality of master devices, and wherein the clock frequency of the memory is changed when a request signal for frequency change is transmitted from a central processing unit of the electronic machine, and a signal notifying the termination of the frequency change is transmitted to the central processing unit when the frequency change is terminated.

3. The memory access control apparatus according to claim 2, wherein a time period when a real-time master device that is greatly affected by an occurrence of a processing delay, among the plurality of master devices, does not access the memory is identified on the basis of the blanking signal to change the clock frequency of the memory.

4. An image pickup apparatus comprising:

a central processing unit;

image pickup means for capturing an image;

a master device performing processing concerning display of the captured image;

a memory that stores data processed by the master device and that adopts a double data rate format; and a memory access control unit changing the frequency of the memory on the basis of an instruction from the central processing unit, wherein the memory access control unit includes
a memory controller controlling the memory;
a double-data-rate physical interface adjusting the timing of an interface signal transferred between the memory controller and the memory;
a double-data-rate physical-interface controller controlling the double-data-rate physical interface; and
a clock controller controlling the frequency of a clock signal, and wherein, in the memory access control unit, a first request signal for controlling the operation of the memory in a self-refresh mode is supplied to the memory controller on the basis of a blanking signal indicating the presence of access from the master device to the memory; a second request signal for resetting the double-data-rate physical interface is supplied to the double-data-rate physical-interface controller on the basis of a response signal to the first request signal, supplied from the memory controller; a third request signal for changing the clock frequency is supplied to the clock controller on the basis of a response signal to the second request signal, supplied from the double-data-rate physical-interface controller; a fourth request signal for setting a parameter for the double-data-rate physical interface in accordance with the clock frequency subjected to the change is supplied to the double-data-rate physical-interface controller on the basis of a response signal to the third request signal, supplied from the clock controller; and a fifth request signal for canceling the operation of the memory in the self-refresh mode is supplied to the memory controller on the basis of a response signal to the fourth request signal, supplied from the double-data-rate physical-interface controller, whereby changing the clock frequency of the memory.

5. An image pickup apparatus comprising:
a central processing unit;
an image pickup unit capturing an image;
a master device performing processing concerning display of the captured image;
a memory that stores data processed by the master device and that adopts a double data rate format; and
a memory access control unit changing the frequency of the memory on the basis of an instruction from the central processing unit,
wherein the memory access control unit includes
a memory controller controlling the memory;
a double-data-rate physical interface adjusting the timing of an interface signal transferred between the memory controller and the memory;
a double-data-rate physical-interface controller controlling the double-data-rate physical interface; and
a clock controller controlling the frequency of a clock signal, and
wherein, in the memory access control unit, a first request signal for controlling the operation of the memory in a self-refresh mode is supplied to the memory controller on the basis of a blanking signal indicating the presence of access from the master device to the memory; a second request signal for resetting the double-data-rate physical interface is supplied to the double-data-rate physical-interface controller on the basis of a response signal to the first request signal, supplied from the memory controller; a third request signal for changing the clock frequency is supplied to the clock controller on the basis of a response signal to the second request signal, supplied from the double-data-rate physical-interface controller; a fourth request signal for setting a parameter for the double-data-rate physical interface in accordance with the clock frequency subjected to the change is supplied to the double-data-rate physical-interface controller on the basis of a response signal to the third request signal, supplied from the clock controller; and a fifth request signal for canceling the operation of the memory in the self-refresh mode is supplied to the memory controller on the basis of a response signal to the fourth request signal, supplied from the double-data-rate physical-interface controller, whereby changing the clock frequency of the memory.

* * * * *